Feb. 13, 1962 L. H. MORIN 3,020,613
LADDER-LIKE BURR SEPARABLE FASTENER
Filed Feb. 20, 1959 2 Sheets-Sheet 1
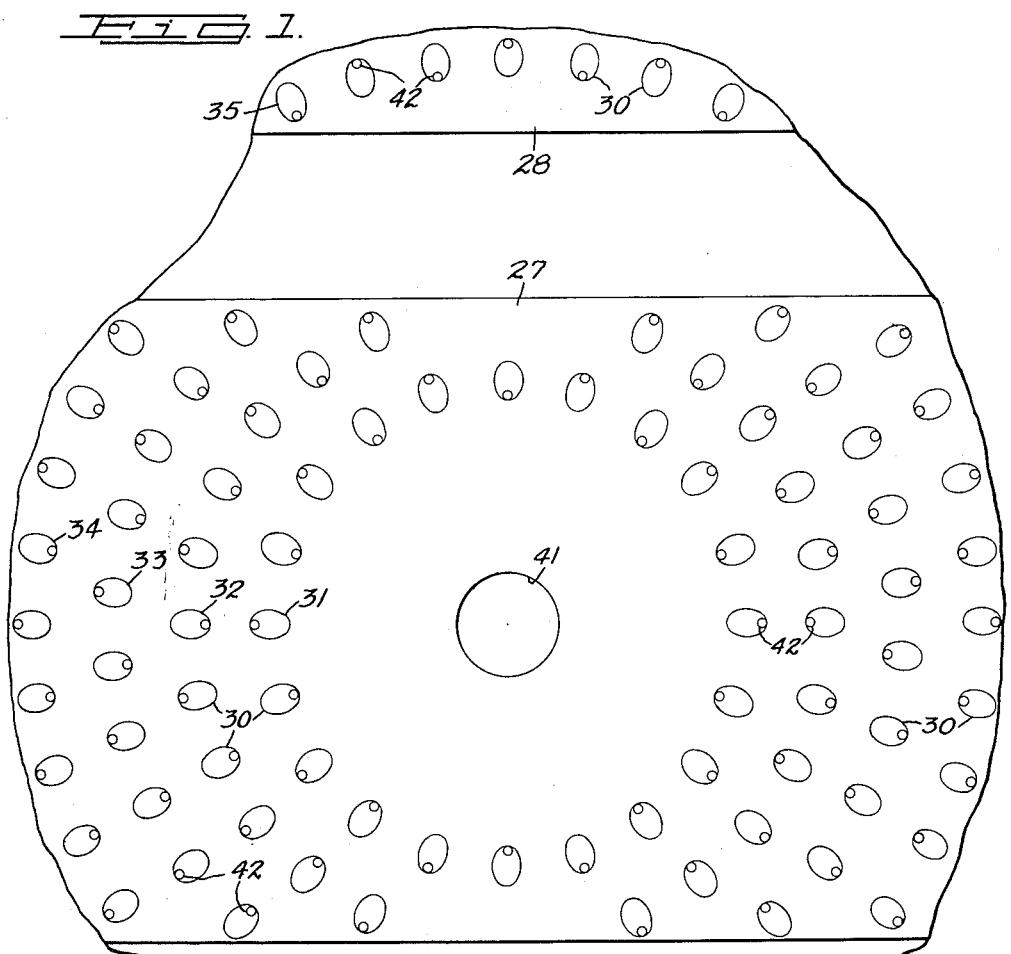
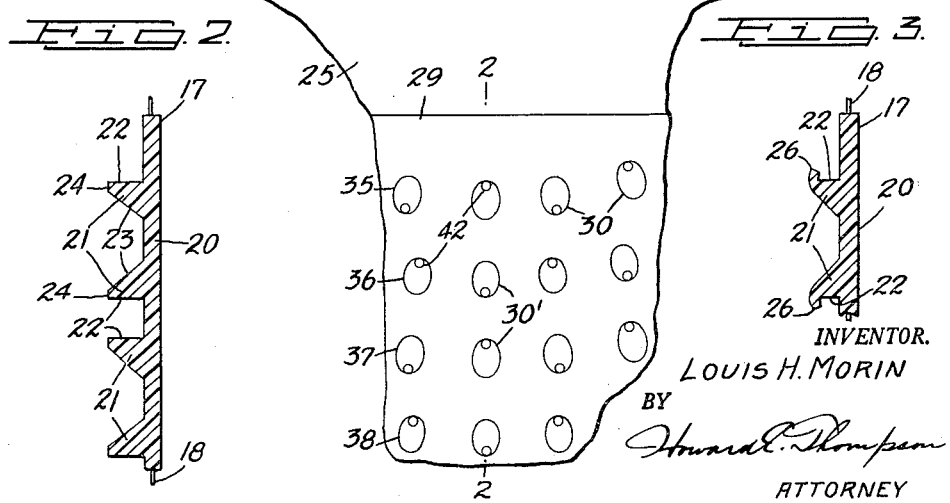
INVENTOR.
LOUIS H. MORIN
BY
Howard E. Thompson
ATTORNEY Feb. 13, 1962  L. H. MORIN  3,020,613
LADDER-LIKE BURR SEPARABLE FASTENER
Filed Feb. 20, 1959  2 Sheets-Sheet 2
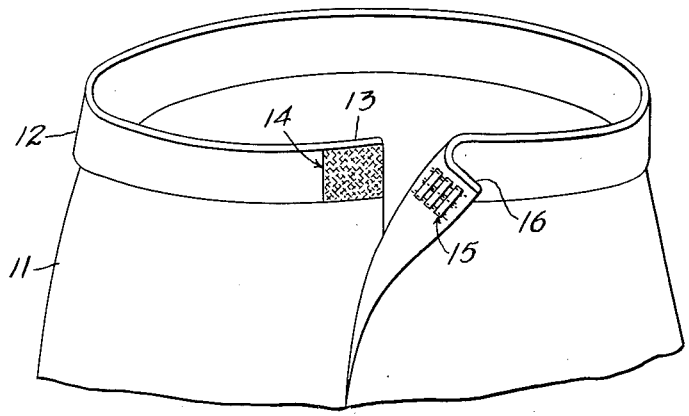
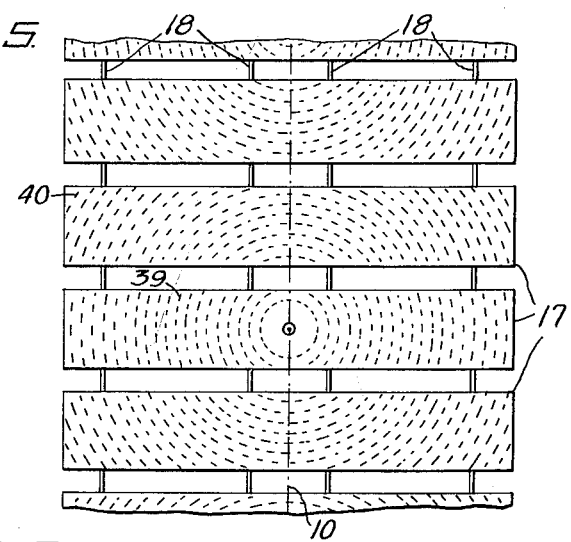
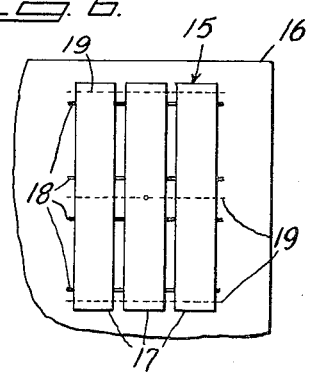
INVENTOR.
LOUIS H. MORIN
BY
Howard E. Thompson
ATTORNEY

United States Patent Office 3,020,613
Patented Feb. 13, 1962

3,020,613
LADDER-LIKE BURR SEPARABLE FASTENER
Louis H. Morin, Bronx, N.Y.
(125 Beechwood Ave., New Rochelle, N.Y.)
Filed Feb. 20, 1959, Ser. No. 794,741
12 Claims. (Cl. 24—204)

This invention relates to what are generally known as separable fasteners employing two cooperating elements fixed to opposed article or garment parts in detachably coupling the same, wherein one element is in the form of one or more burr members united to form a ladder-like structure.

More particularly, the invention deals with a fastener of the character described, wherein burr members are molded upon two or more coupling and spacing strands to space the members one from another in a fastener element of predetermined size and, wherein, the burrs of each member each include offset or hook portions arranged in different directions and angularities in establishing a positive coupling with the companion looped fabric element of the fastener.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of portions of three dies utilized in simultaneously molding a plurality of burr members.

FIG. 2 is an enlarged detail sectional view through a portion of a burr member molded from the part of the die on the line 2—2 of FIG. 1.

FIG. 3 is a sectional view showing part of the construction of FIG. 2, after the forming operation has been performed on the burr member.

FIG. 4 is a diagrammatic perspective view of the waistband portion of a pair of shorts, illustrating the two elements of the fastener diagrammatically and showing the burr element on an outwardly turned portion of the waistband of the garment.

FIG. 5 is a diagrammatic plan view illustrating the formation of a successive series of burr elements, the burrs of each of the elements being diagrammatically represented by dotted lines without reference to specific location of the elements; and FIG. 6 is an enlarged detail view of the burr element shown in FIG. 4, omitting illustration of the burrs.

The subject matter of this application is produced substantially in accordance with the teachings in the method disclosed in a companion application, filed of equal date herewith, the present structure being modified to the extent of utilizing a group of dies, as, for example, three in forming a successive series of three elements united by two or more strands forming inserts molded in the burr members of each element and utilized in joining and alining the elements one with respect to the other.

In the present illustration, the burr members of each element are shown joined by four strands, but assemblages of this type and kind can be severed centrally, for example, along the dot-dash line 10 of FIG. 5 of the drawing to form narrower elements, each of the members of which would be joined by two of the strands. It should here also be understood that the structure of the dies can be such as to directly mold the narrower elements by simply establishing a partitioning or spacing die member along the dot-dash line 10.

In order to illustrate a use of fasteners of the type and kind under consideration, I have shown in FIG. 4 of the drawing the upper portion of a pair of shorts 11, having a waistband portion 12. Fixed to one side or end 13 of the waistband portion is one element 14 of the fastener, said element being shown by crosshatch lines to diagrammatically represent a looped fabric.

At 15 is shown the other burr element of the fastener fixed to the inner surface of the other side or end 16 of the waistband 12. The element 15 is substantially of ladder-like structure, as clearly noted in FIG. 6 of the drawing, the element 15 comprising three bar or rung-like members 17 integrally joined by four flexible thread-like strands 18 which space and aline the members 17 one with respect to the other.

In attaching the element 15 to the end 16, the members 17 are stitched to 16 by three lines of stitchings, as at 19. The element 15 is so located on the end 16 as to register with the element 14, so that the burrs of the members 15 will imbed themselves in the pile of the loop fabric of 14 and engage the loops thereof in securely coupling the ends 13, 16 of the waistband 12 against strained separation in the plane of said ends while, at the same time, facilitating separation of the elements by pulling the element 15 perpendicularly away from the element 14.

Now, turning to FIGS. 2 and 3 of the drawing, in these figures, I have shown an enlarged sectional detail view through a portion of one of the members 17, FIG. 2 illustrating the member as it is formed in the die; whereas, FIG. 3 illustrates the completed formation of the member 17. Each member comprises a sheet or body portion 20, having burrs 21 projecting from one surface thereof, each burr being defined by a straight wall portion 22 and a bevelled and rounded wall portion 23, these walls terminating in contracted ends 24. The burrs 21 are of conical formation but with their axes inclined in relation to the sheet 20 to produce the opposite side wall portions 22 and 23 extending in the directions indicated, as described in the aforesaid companion application.

As previously stated, the showings in FIGS. 2 and 3 are very much enlarged, as compared with the diagrammatic illustrations in FIGS. 4, 5 and 6. Roughly, there would be actually two hundred fifty or more burrs on each of the members 17, for example, there may be as many as 1066 burrs over an area of 1½" x ¾". For this reason, applicant has resorted to the very diagrammatic showing of the burrs in FIG. 5, with no attempt to illustrate the burrs in the element 15 of FIGS. 4 and 6.

After the members 17 have been formed from the die shown, in part, at 25 in FIG. 1 of the drawing, the burrs 21, or the contracted ends 24 thereof, are offset or made substantially hook-shaped in form, as indicated at 26 in FIG. 3 of the drawing, this operation being performed by a forming die in accordance with the teachings in said companion application, which simply applies pressure to the contracted ends 24 to turn said ends in the direction of the straight sides 22 of each of the burrs in the manner diagrammatically illustrated in FIG. 3 of the drawing.

While various methods may be employed in producing the fastener, for purposes of illustration, I employ in the die 25 three spaced die members, for example, the central member 27 and the end members 28 and 29, all of which are only partially shown to simplify the illustration, the showing in FIG. 1 being very much enlarged, as will be apparent. This will be appreciated, to a degree, in visualizing the normal size of the three members of the burr element 15, as illustrated in FIG. 6 of the drawing.

The dies 27, 28 and 29 have circular arrangements of the burr forming cavities thereon in concentric circumferential rows, the cavities being generally identified by the reference character 30 and part of the circumferential rows of the cavities are indicated at 31, 32, 33 and 34, portions of other rows being indicated at 35 on the dies 28 and 29; whereas, other rows of the cavities are indicated at 36, 37 and 38 on the die 29. Beyond this are additional rows of these cavities which are diagrammatically illustrated by the dash lines extending from the row 39 of FIG. 5 to the outermost row which is identified as the row 40 in said figure. The advantage of laying out the cavities in circumferential concentric rows on a die blank has been described in the aforesaid companion application.

It will appear from the diagrammatic showing of FIG. 5 that, in each casting operation, three of the plastic burr members 17 are simultaneously formed which, in the present illustration, defines the section 15. However, multiplicities of these groups of burr members are continuously formed and the strands 18 are severed between the burr members in forming the desired size of the resulting element 15. In some cases, the fastener element would comprise a multiplicity of the burr members 17, particularly in providing fasteners for garments, such as jackets, windbreakers and the like, in which event, the ladder-like burr fastener will extend longitudinally of one edge portion of the garment.

It will appear, from a consideration of FIG. 1, that the center die 27 has an aperture 41. This serves to position or locate the cast units in the forming machine. The burr members or the burr sections are formed preferably from molded plastic material, such as nylon, and it will appear from the arrangement of the cavities in the dies that the small round holes 42, defining the contracted ends 24 of the resulting burrs, are alternately arranged or, in other words, oppositely positioned in each of the rows of cavities 30 and, by virtue of the spacing of the cavities in one row offset with those in adjacent rows, the axial line of the cavities will be in different radial positions throughout the major portion of the cavities, with the exception of the cavities 30′, through which the section 2—2 is taken.

This automatically extends the offset or hook portions 26 of the final end product or burr member in many angular directions which establishes a positive coupling engagement with the looped fabric 14 to retain the elements 14 and 15 against pull-apart separation substantially in the plane of the elements or, in other words, considering the waistband portion 12, no strain tending to increase the circumferential dimension of the waistband would operate to separate the elements 14 and 15. On the other hand, the end 16 can be grasped in a hand and pulled outwardly or vertically away from the end 13 in separating the element for removal of the garment and, in this operation, the inherent flexibility and elasticity of the plastic burrs or their end portions 26 will facilitate disengagement of the elements. In this connection, it should be kept in mind that, in the other strains or stresses to which the elements may be subjected, the loops of the fabric on the element 14 operate substantially on the body portion of each of the burrs which will be sufficient to securely retain the elements against separation.

In uses, such as diagrammatically illustrated in FIG. 4, it will be understood that the element 14 can be constructed in varying lengths to provide for adjustability of the waistband portion for proper fit about the body of the wearer. This would be particularly desirable in utilizing the fastener in joining the end portions of belts, which would be equivalent to the waistband portions 12, as illustrated in FIG. 4.

It will be apparent from the foregoing that in producing fasteners of the character described, the method consists in simultaneously forming three or more joined burr members forming what I have described as rungs of a ladder by utilizing the series of dies, as indicated, in part, in FIG. 1, to first mold or cast the blanks in the form shown, in part, in FIG. 2; whereupon, the contracted ends of the burrs are offset or rendered substantially hook-shaped in form, as indicated at 26 in FIG. 3 of the drawing, in forming the resulting end product which, after trimming or otherwise cutting to size, is applied to the support, as for example, the attachment of 15 to the garment, as diagrammatically illustrated in FIG. 4. The looped fabric is of the general type referred to in the aforesaid companion application.

The threads 18, which will preferably be nylon, serve to bind all of the ladder elements together with ease of handling by the garment manufacturer sewing them on in a continuous manner.

Having fully described my invention what I claim as new and desire to secure by Letters Patent is:

1. In separable fasteners of the character described, a burr fastener element comprising a plurality of coupled rung-like members, each including a sheet, and a multiplicity of burrs having offset ends disposed on one surface of the sheet, said burrs being disposed in circumferential rows spaced radially on the sheet, with the offset ends arranged in varied directions and angles on said surface of said sheet.

2. In separable fasteners of the character described, a burr fastener element comprising a plurality of coupled rung-like members, each including a sheet, and a multiplicity of burrs having offset ends disposed on one surface of the sheet, said burrs being disposed in circumferential rows spaced radially on the sheet, with the offset ends arranged in varied directions and angles on said surface of said sheet, the coupling of said rung-like members being through the medium of strands joined into a unit with the members and spacing adjacent members one from the other.

3. In separable fasteners of the character described, a burr fastener element comprising a plurality of coupled rung-like members, each including a sheet, and a multiplicity of burrs having offset ends disposed on one surface of the sheet, said burrs being disposed in circumferential rows spaced radially on the sheet, with the offset ends arranged in varied directions and angles on said surfaces of said sheet, each of said burrs comprising a straight wall portion perpendicular to said sheet and inclined wall portions, and said offset ends extending in the direction of said straight wall portion.

4. In separable fasteners of the character described, a burr fastener element comprising a plurality of coupled rung-like members, each including a sheet, and a multiplicity of burrs having offset contracted ends disposed on one surface of the sheet, said burrs being disposed in circumferential rows spaced radially on the sheet, with the offset contracted ends arranged in varied directions and angles on said surfaces of said sheet, each of said burrs comprising a straight wall portion perpendicular to said sheet and inclined wall portions, said offset ends extending in the direction of said straight wall portion, and said offset portions being substantially hook-shaped in form.

5. In separable fasteners of the character described, a burr fastener element comprising a plurality of coupled rung-like members, each including a sheet, and a multiplicity of burrs having offset contracted ends disposed on one surface of the sheet, said burrs being disposed in circumferential rows spaced radially on the sheet, with the offset contracted ends arranged in varied directions and angles on said surface of said sheet, and the spacing of the major portion of the burrs on said sheet being such that their axes are in varied radial lines.

6. In separable fasteners of the character described, a burr fastener element comprising a plurality of coupled rung-like members, each including a sheet, and a multiplicity of burrs having offset contracted ends disposed on one surface of the sheet, said burrs being disposed in circumferential rows spaced radially on the sheet, with the offset contracted ends arranged in varied directions and angles on said surface of said sheet, and the offset portions of the burrs in each row being alternately offset in opposed directions.

7. In separable fasteners of the character described, a burr fastener element comprising a plurality of coupled rung-like members, each including a sheet, and a multiplicity of burrs having offset contracted ends disposed on one surface of the sheet, said burrs being disposed in circumferential rows spaced radially on the sheet, with the offset contracted ends arranged in varied directions and angles on said surface of said sheet, the rung-like members of said element being adapted to be secured directly to a support, the companion member of the fastener comprising a looped fabric member secured to a companion support, and the burrs of said rung-like members being adapted to adjustably engage said looped member in adjustably coupling the supports and to retain said supports against strained separation.

8. In separable fasteners of the character described, a burr fastener element comprising a plurality of coupled rung-like members, each including a sheet, and a multiplicity of burrs having offset contracted ends disposed on one surface of the sheet, said burrs being disposed in circumferential rows spaced radially on the sheet, with the offset contracted ends arranged in varied directions and angles on said surface of said sheet, the rung-like members of said element being adapted to be secured directly to a support, the companion member of the fastener comprising a looped fabric member secured to a companion support, the burrs of said rung-like members being adapted to adjustably engage said looped member in adjustably coupling the supports and to retain said supports against strained separation, and the rung-like members of said coupling element being joined and spaced by strands spaced longitudinally of the rung-like members.

9. In separable fasteners of the character described, a burr fastener element comprising a plurality of coupled rung-like members, each including a sheet, and a multiplicity of burrs having offset ends extending integrally from one surface of the sheet, said burrs being spaced over the major portion of said surface of the sheet, the offset portions of said burrs being extended in opposed and different angular relationships throughout the major portion of the burrs on said sheet.

10. In separable fasteners of the character described, a burr fastener element comprising a plurality of coupled rung-like members, each including a sheet, and a multiplicity of burrs having offset contracted ends extending integrally from one surface of the sheet, said burrs being spaced over the major portion of said surface of the sheet, the offset portions of said burrs being extended in opposed and different angular relationships throughout the major portion of the burrs on said sheet, said element having means joining and spacing said members, and said members being in the form of molded plastics.

11. In separable fasteners of the character described, a burr fastener element comprising a plurality of coupled rung-like members, each including a sheet, and a multiplicity of burrs having offset contracted ends extending integrally from one surface of the sheet, said burrs being spaced over the major portion of said surface of the sheet, the offset portions of said burrs being extended in opposed and different angular relationships throughout the major portion of the burrs on said sheet, said element having means joining and spacing said members, each burr of each member having a perpendicularly straight wall portion, and said offset ends extending in the direction of said straight wall portion.

12. In separable fasteners of the character described, a burr fastener element comprising a plurality of coupled rung-like members, each including a sheet, a multiplicity of burrs having offset contracted ends extending integrally from one surface of the sheet, said burrs being spaced over the major portion of said surface of the sheet, the offset portions of said burrs being extended in opposed and different angular relationships throughout the major portion of the burrs on said sheet, said element having means joining and spacing said members, each burr of each member having opposite sides converging away from said surface, one of said sides extending closer to the perpendicular with respect to said surface than the other side, the offset ends extending in the directions of the more perpendicular sides of the burrs.

References Cited in the file of this patent

UNITED STATES PATENTS

| | | |
|---|---|---|
| 2,262,881 | Boenecke | Nov. 18, 1941 |
| 2,302,912 | Poux | Nov. 24, 1942 |
| 2,841,850 | Zahorski | July 8, 1958 |
| 2,880,488 | Macy | Apr. 7, 1959 |